Feb. 10, 1948.  J. H. WESSEL  2,435,764
HUB
Filed July 14, 1945
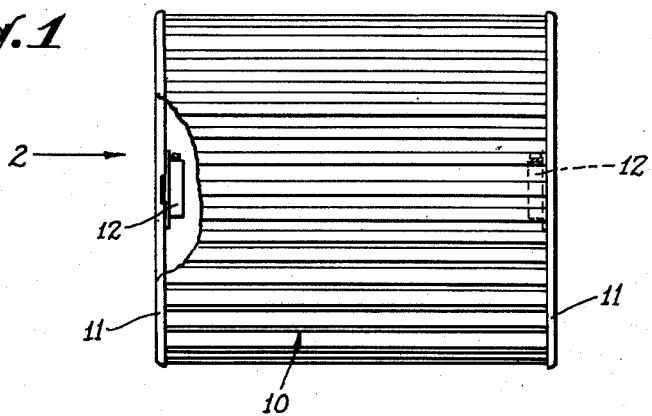
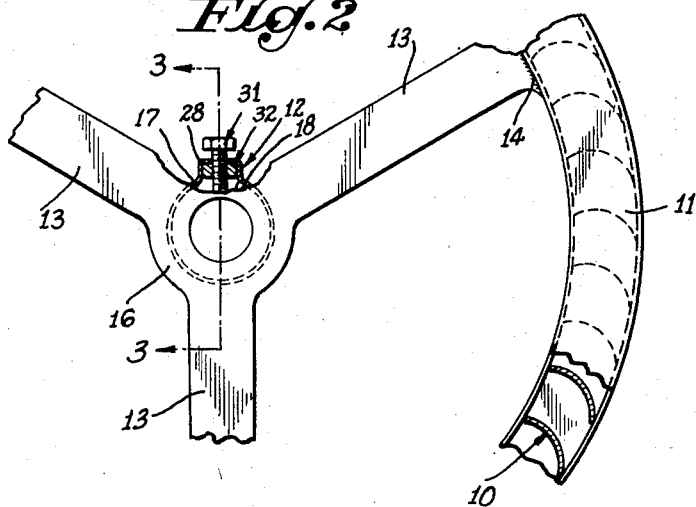
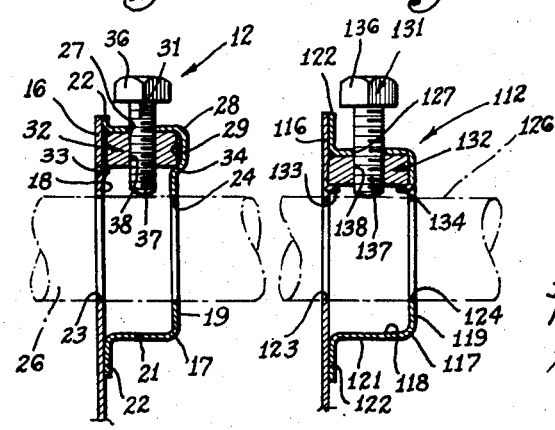
INVENTOR
JOHN H. WESSEL
BY
HARRIS, KIECH, FOSTER & HARRIS
FOR THE FIRM
ATTORNEYS Patented Feb. 10, 1948

2,435,764

UNITED STATES PATENT OFFICE 2,435,764

HUB

John H. Wessel, Los Angeles, Calif., assignor to Utility Appliance Corp., Los Angeles, Calif., a corporation of California Application July 14, 1945, Serial No. 605,030

4 Claims. (Cl. 287—52)

My invention relates to hubs and, more specifically, to a hub which is adapted for being mounted on a shaft in locked engagement therewith. The present specification includes an exemplary application of the fundamental concepts of the invention to a hub for a rotor of the type that is employed in centrifugal blower installations. However, the invention is susceptible to various other applications and I do not intend to be limited to the specific application thereof which is disclosed herein.

A primary objective of my invention is the provision of a hub of simple construction which includes a minimum number of individual components, the components thereof being easily fabricated and assembled to produce the completed article. The basic components of the hub are preferably formed of a relatively thin material such as sheet metal, for example, and are particularly adapted to being formed by stamping operations.

Another objective of my invention is the provision of a hub which may be secured to, or formed integrally with a plurality of substantially radial arms, or spokes which support a structure to be carried by the hub. The structure to be carried by the hub may, for example, be the vane assembly of a rotor for use with centrifugal blower installations.

A further objective of my invention is the provision of a hub including a primary member and a housing member which are secured together to define a space therebetween, the primary member preferably being substantially plane and circular and the housing member preferably being substantially cylindrical. The primary and housing members are provided with axially aligned openings therethrough which are adapted to receive a suitable shaft.

An additional objective of my invention is the provision of locking means which extends into the space between the primary and housing members and is adapted for locked engagement with the shaft to secure the hub thereto. The space between the housing and primary members preferably accommodates retaining means which is adapted for engagement with the locking means to maintain the locking means in engagement with the shaft.

The foregoing and various other objectives and advantages of my invention may be realized by means of the embodiments shown in the accompanying drawing, which is for illustrative purpose only, wherein:

Fig. 1 is an elevational view illustrating an exemplary application of my invention to a rotor for a centrifugal blower installation, parts of the rotor being broken away to show the hub;

Fig. 2 is a fragmentary end view of the rotor taken in the direction indicated by the arrow 2 of Fig. 1, parts of the hub being broken away to show the construction thereof;

Fig. 3 is a transverse sectional view of the hub and is taken as indicated by the broken line 3—3 of Fig. 2; and Fig. 4 is a view which is similar to Fig. 3, but illustrates another embodiment of my invention.

Referring particularly to Figs. 1 and 2, the rotor includes a vane assembly 10 which is mounted on annular rims 11, the rims 11 being connected to hubs 12 by substantially radial arms 13. The arms 13 are preferably formed integrally with the hubs 12 and may also be formed integrally with the annular rims 11 if desired. The construction illustrated provides for welding the rims 11 to the arms 13 as indicated at 14, although the rims 11 and arms 13 may be connected in any suitable manner as is well known in the art.

Each hub 12 includes a primary member 16 which is preferably a substantially plane and circular disc that is formed integrally with the arms 13. A housing member 17 is secured to the disc 16 and cooperates therewith to define a space 18 therebetween, the housing member 17 preferably being substantially cylindrical and being defined by a transverse wall 19 and peripheral wall 21. The housing member 17 also includes an annular flange 22 which is formed integrally with the peripheral wall 21 thereof, the flange 22 being secured to the disc 16 in any suitable manner. The disc 16 and transverse wall 19 of the housing 17 are provided with substantially aligned axial openings 23 and 24 therethrough, respectively, the openings 23 and 24 being adapted to accommodate a shaft 26 (shown in phantom in Fig. 3).

The peripheral wall 21 of the housing 17 is provided with a radial opening 27 therethrough which communicates with the space 18, a portion 28 of the housing 17 adjacent the radial opening 27 being deformed outwardly to provide a receptacle 29 which forms part of the space 18. The hub 12 includes locking means 31 which extends through the opening 27 and receptacle 29 into the space 18, the locking means 31 being adapted for locked engagement with the shaft 26 to prevent relative rotation of the hub 12 and shaft 26. The locking means 31 is maintained in locked engagement with the shaft 26 by retaining means 32 disposed in the receptacle 29, the retaining means 32 being secured in the receptacle 29 by axially aligned projections 33 and 34 which extend into the space 18. The projection 33 is formed integrally with the disc 16 and the projection 34 is formed integrally with the transverse wall 19 of the housing 17.

The locking means 31 preferably comprises a locking member such as a conventional bolt having a head 36 and a threaded shank 37, the shank 37 being inserted into the space 18 through the radial opening 27. The retaining means 32 preferably comprises a retaining member such as a conventional nut having a threaded hole 38 therethrough, the threads on the wall of the hole 38 in the retaining member 32 being complementary to and adapted for engagement with the threads on the locking member 31 to retain the locking member 31.

The hub 12 is adapted for economical and rapid fabrication and assembly, the primary member, or disc 16 and housing 17 being particularly adapted to being formed by stamping operations. If desired, the disc 16 may also be formed integrally with the arms 13 as previously indicated. The flange 22 of the housing 17 may be secured to the disc 16 by welding, riveting, or otherwise as is well known in the art. The locking member 31 and retaining member 32 provide a simple means for locking the hub 12 relative to the shaft 26 and are adapted for facile assembly with the disc 16 and housing 17, the retaining member 32 being secured only by the projections 33 and 34.

The embodiment of the hub shown in Fig. 4 is similar to the embodiment previously described and is indicated generally by the numeral 112, the components of the hub 112 being identified by numerals which differ from the identifying numerals of corresponding components of the hub 12 by the addition of the numeral "100" thereto. Thus, the hub 112 includes a primary member, or disc 116 which is secured to a cylindrical housing 117 to define a space 118 therebetween, the housing 117 including a transverse wall 119 and peripheral wall 121. The disc 116 and housing 117 are provided with axial openings 123 and 124, respectively, which are adapted for accommodating a shaft 126, and portions of the disc 116 and housing 117 are bent to define axially aligned projections 133 and 134 which extend into the space 118 to secure a retaining member 132. The retaining member 132 is disposed in the space 118 adjacent the peripheral wall 121 of the housing 117, thereby eliminating the receptacle 29 of the hub 12. The peripheral wall 121 of the housing 117 is provided with a radial opening 127 for a locking member 131 which is adapted for threaded engagement with the retaining member 132 in the manner previously described, the locking member 131 being adapted for engagement with the shaft 126 to lock the hub 112 thereto.

The hub 112 may be fabricated more easily and economically than the hub 12 by virtue of the elimination of the receptacle 29 for the retaining member 32. The retaining member 132 is disposed in the space 118 between the shaft 126 and the peripheral wall 121 of the housing 117 and is secured therein by the inwardly extending projections 133 and 134.

Although I have described two exemplary embodiments of my invention and have described an application of one of the embodiments thereof to a rotor for centrifugal blowers, I do not intend to be limited to the specific disclosures contained herein since the invention may be employed in other installations and various changes, modifications, and substitutions may be incorporated in the invention without departing from the spirit thereof as defined by the appended claims.

I claim as my invention:

1. In a hub, the combination of: a disc provided with a central opening; a generally cup-shaped member connected to said disc and cooperating therewith to define a space, said cup-shaped member including a peripheral wall having a radial opening which communicates with said space, and including a transverse wall having a central opening which is aligned with said opening in said disc; a nut having a threaded opening therethrough, said nut being positioned in said space with said threaded opening in registry with said radial opening in said peripheral wall, and being in contact with portions of said transverse and peripheral walls and with a portion of said disc; means for retaining said nut in said position in said space comprising a projection on said disc and a projection on said transverse wall, said projections extending into said space and engaging said nut; and a screw extending through said radial opening in said peripheral wall and threaded in said opening in said nut.

2. In a hub, the combination of: a generally cup-shaped member having a radially extending flange having a transverse wall spaced from and substantially parallel to said flange, and having a peripheral wall joining said flange and said transverse wall, said peripheral wall having a radially extending opening and said transverse wall being provided with an axially extending opening; a disc secured to said flange and provided with an axially extending opening which is aligned with said opening in said transverse wall, said disc cooperating with said peripheral and transverse walls to provide a space; a nut having a threaded opening therethrough, said nut being so positioned in said space that said threaded opening registers with said radially extending opening in said peripheral wall; and means including a projection on said disc and a projection on said transverse wall for retaining said nut in said position, said projections extending inwardly into said space into engagement with said nut and being spaced radially from the respective openings in said disc and said transverse wall.

3. A hub as set forth in claim 2 in which said projections for retaining said nut are formed by bending portions of said disc and said transverse wall inwardly into said space at points spaced radially from the respective openings in said disc and said transverse wall.

4. In a rotor, the combination of: a disc provided with a central opening; a plurality of outwardly extending radial arms connected at their inner ends to said disc; an annular rim connected to said arms at their outer ends; a plurality of vanes carried by said rim; a generally cup-shaped member connected to said disc and cooperating therewith to define a space, said cup-shaped member having a peripheral wall which is provided with a radially extending opening communicating with said space, and having a transverse wall which is provided with a central opening, said opening in said disc and said opening in said transverse wall being axially aligned; a nut provided with a threaded opening therethrough, said nut being so positioned in said space that said threaded opening is in registry with said radial opening in said peripheral wall; means comprising a projection on said disc and a projection on said transverse wall for retaining said nut in such a position, said projections extending inwardly into said space and engaging said nut; and a screw extending through said radial opening in said peripheral wall and threaded in said opening in said nut.

JOHN H. WESSEL.

REFERENCES CITED

The following references are of record in the file of this patent:

UNITED STATES PATENTS

| Number | Name | Date |
|---|---|---|
| 895,409 | Hallowell | Aug. 4, 1908 |
| 1,045,283 | Hallowell | Nov. 26, 1912 |
| 1,550,173 | Lamar | Aug. 18, 1925 |